(12) United States Patent
Lee et al.

(10) Patent No.: US 9,440,853 B2
(45) Date of Patent: Sep. 13, 2016

(54) HAFNIUM TELLURIDE LAYERED COMPOUNDS, TRANSPARENT AND ELECTRICALLY CONDUCTIVE FILM, AND ELECTRONIC DEVICES INCLUDING THE SAME

(71) Applicant: Samsung Electronics Co., Ltd., Suwon-Si, Gyeonggi-Do (KR)

(72) Inventors: Kimoon Lee, Seoul (KR); Byungki Ryu, Hwaseong-si (KR); Yoon Chul Son, Hwaseong-si (KR); Hyeon Cheol Park, Hwaseong-si (KR); Sang Mock Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 43 days.

(21) Appl. No.: 14/610,783

(22) Filed: Jan. 30, 2015

(65) Prior Publication Data

US 2015/0225239 A1 Aug. 13, 2015

(30) Foreign Application Priority Data

Feb. 10, 2014 (KR) ........................ 10-2014-0014923

(51) Int. Cl.
```
H01B 1/06      (2006.01)
H01B 1/10      (2006.01)
C01B 25/14     (2006.01)
C01B 19/00     (2006.01)
C01G 28/00     (2006.01)
C01G 30/00     (2006.01)
C01G 29/00     (2006.01)
H01B 1/02      (2006.01)
C01G 27/00     (2006.01)
```

(52) U.S. Cl.
CPC ............ *C01B 25/14* (2013.01); *C01B 19/002* (2013.01); *H01B 1/06* (2013.01); *H01B 1/10* (2013.01); *C01B 19/007* (2013.01); *C01G 27/006* (2013.01); *C01G 28/002* (2013.01); *C01G 29/006* (2013.01); *C01G 30/002* (2013.01); *C01P 2002/52* (2013.01); *C01P 2002/72* (2013.01); *C01P 2002/77* (2013.01); *C01P 2006/40* (2013.01); *H01B 1/02* (2013.01)

(58) Field of Classification Search
None
See application file for complete search history.

(56) References Cited

U.S. PATENT DOCUMENTS 8,294,133 B2   10/2012   Ikeda

2006/0097241 A1*  5/2006  Harris ..................... C30B 29/68
                                                          257/9
2013/0068270 A1   3/2013  Choi et al.
2015/0166340 A1*  6/2015  Son ...................... H01L 31/0264
                                                          428/220

FOREIGN PATENT DOCUMENTS

| JP | 2007149996 A | 6/2007 |
| JP | 2007320829 A | 12/2007 |
| WO | WO-02095841 A2 | 11/2002 |
| WO | WO-03041183 A1 | 5/2003 |

OTHER PUBLICATIONS

Canadell et al. Energy Factors Governing the Partial Irreversibility of Lithium Intercalation in Layered Trichalcogenides MX3 (M = Ti, Zr, Hf; X = S, Se) and the Structural Changes in the Intercalated Species Li3MX3. Inorganic Chemistry, vol. 28, No. 15, 1989.*

Gupta et al. Two-mode behavior in mixed layer crystal hafnium sulfide telluride. Physica B: Condensed Matter Amsterdam Netherlands (1989), 159(3).*

Garg et al. MREI-model calculations for layered mixed crystals of the series HfS2-xTex. Indian Journal of Pure & Applied Physics. vol. 46, 2008.*

Mizuguchi et al. New Intermetallic Ternary Phosphide Chalcogenide AP2-xXx Superconductors with PbFCl Type Crystal Structure. Journal of the Physical Society of Japan, 83, 2014.*

Soheilnia et al. Crystal Structure, Electronic Structure, and Physical Properties of Two New Antimonide-Tellurides: ZrSbTe and HfSbTe. Chem. Mater. 2007, 19, 1482-1488.*

Kleinke et al. HfSb2-xTex: The Second New Compound on the Quasi-Binary Section HfSb2—HfTe2 with different Sb—Sb interaction. Z. Anorg. Allg. Chem, 2011, 637.*

Lin, Jeng-Yu, et al. "Electrophoretic deposition of transparent MoS$_2$-graphene nanosheet composite films as counter electrodes in dye-sensitized solar cells" *Chem. Commun.*, (2013), vol. 49, Issue 14, pp. 1440-1442.

Ménoret, Antoine, "Purification of recombinant and endogenous HSP70s" Methods. (2004), vol. 32, pp. 7-12.

Bolivar, H, et al. "Methanol oxidation at Pt/MoO x /MoSe2 thin film electrodes prepared with exfoliated MoSe2" Journal of Applied Electrochemistry (2003) vol. 33, Issue 12, pp. 1191-1198.

Lee, Hee Sung, et al. "MoS2 Nanosheet Phototransistors with Thickness-Modulated Optical Energy Gap," Nano Letters, (2012), vol. 12, Issue 7, pp. 3695-3700.

Elías, Ana Laura, "Controlled Synthesis and Transfer of Large Area WS2 Sheets: From Single-Layer to Few-Layers," ACS Nano, (2013), vol. 7, Issue 6, pp. 5235-5242.

(Continued)

*Primary Examiner* — Tanisha Diggs
(74) *Attorney, Agent, or Firm* — Harness, Dickey & Pierce, P.L.C.

(57) ABSTRACT

A hafnium telluride compound includes a layered crystal structure and represented by the following Chemical Formula 1.

$$Hf_3Te_{2-x}A_x \qquad \text{[Chemical Formula 1]}$$

Herein, A is at least one selected from phosphorus (P), Arsenic (As), antimony (Sb), bismuth (Bi), sulfur (S) and selenium (Se), and $0 < x \le 1$.

13 Claims, 11 Drawing Sheets

(56) References Cited

OTHER PUBLICATIONS

Wassei, Jonathan, et al., "Graphene, a promising transparent conductor" Materials Today, (2010) vol. 13, Issue 3, pp. 52-59.

Novoselov, K.S., et al, "Electric Field Effect in Atomically Thin Carbon Films," Science, (2004) vol. 306, pp. 666-669.

Wang, Qing Hua, et al. "Electronics and optoelectronics of two-dimensional transition metal dichalcogenides," Nature Nanotechnology (2012), vol. 7, pp. 699-712.

Abdon, Robert L., et al., "$Hf_3Te_2$: A New and Remarkable Layered Compound," Communication, Angewandte Chemie International Edition in English, (1994), vol. 33, Issue 22, pp. 2328-2330.

Chhowalla, Manish, et al., "The chemistry of two-dimensional layered transition metal dichalcogenide nanosheets," Nature Chemistry, (2013), vol. 5, pp. 263-275.

Bae, Sukang, et al., "Roll-to-roll production of 30-inch graphene films for transparent electrodes," Nature Nanotechnology, (2010), vol. 5, pp. 574-578.

* cited by examiner

HAFNIUM TELLURIDE LAYERED COMPOUNDS, TRANSPARENT AND ELECTRICALLY CONDUCTIVE FILM, AND ELECTRONIC DEVICES INCLUDING THE SAME

CROSS-REFERENCE TO RELATED APPLICATION

This application claims priority to and the benefit of Korean Patent Application No. 10-2014-0014923 filed in the Korean Intellectual Property Office on Feb. 10, 2014, the entire contents of which are incorporated herein by reference.

BACKGROUND

1. Field

Example embodiments relate to a hafnium telluride layered compound, a transparent and electrically conductive film including the same, and an electronic device including the same.

2. Description of the Related Art

An electronic device, for example, a flat panel display (e.g., an LCD or LED), a touch panel screen, a solar cell, and a transparent transistor, includes a transparent and electrically conductive film. A material for the transparent and electrically conductive film may be required to have, for example, relatively high light transmittance of greater than or equal to about 80% and relatively low specific resistance of less than or equal to about $1\times10^{-3}$ $\Omega$*cm in a visible light region. The currently-used material for the transparent and electrically conductive film includes indium tin oxide (ITO), tin oxide ($SnO_2$), and zinc oxide (ZnO). Since the indium tin oxide (ITO) has insufficient flexibility and inevitably costs more due to limited reserve of indium, development of an alternative material is required. The tin oxide ($SnO_2$) and the zinc oxide (ZnO) have relatively low conductivity and undesirable flexibility.

Accordingly, development of a material for a transparent and electrically conductive film having relatively high transparency, improved conductivity, and improved flexibility is required.

SUMMARY

Example embodiments provide a hafnium telluride layered compound.

Example embodiments also provide a transparent and electrically conductive film including the hafnium telluride layered compound.

Example embodiments also provide an electronic device including the transparent electrode material.

According to example embodiments, a hafnium telluride compound includes a layered crystal structure and is represented by the following Chemical Formula 1.

$Hf_3Te_{2-x}A_x$  [Chemical Formula 1]

Herein, A is at least one selected from phosphorus (P), arsenic (As), antimony (Sb), bismuth (Bi), sulfur (S) and selenium (Se), and $0<x\leq1$.

The compound may be represented by $Hf_3Te_{2-x}P_x$ ($0<x\leq1$).

The compound may have a lattice constant (c) of greater than about 17.5 angstroms in a direction perpendicular to a unit structure layer.

The absorption coefficient (a) of the compound may have a ratio ($a/a_0$) of less than or equal to about 1 relative to a $Hf_3Te_2$ absorption coefficient ($a_0$) for light ranging from about 1.8 to about 3.2 eV.

The compound may have specific resistance of less than or equal to about $1\times10^{-3}$ $\Omega$cm at about 300 K.

According to example embodiments, a transparent and electrically conductive film includes a hafnium telluride compound having a layered crystal structure and represented by the above Chemical Formula 1.

The compound may be represented by $Hf_3Te_{2-x}P_x$ ($0<x\leq1$).

The compound may have a lattice constant (c) of greater than about 17.5 angstroms in a direction perpendicular to a unit structure layer.

The absorption coefficient (a) of the hafnium telluride compound may have a ratio ($a/a_0$) of less than or equal to about 1 relative to a $Hf_3Te_2$ absorption coefficient ($a_0$) for light ranging from about 1.8 to about 3.2 eV.

The transparent conductive thin film may have specific resistance of less than or equal to about $1\times10^{-3}$ $\Omega$cm at 0° C. to about 100° C.

According to example embodiments, an electronic device includes the transparent and electrically conductive film of example embodiments.

The compound may be represented by $Hf_3Te_{2-x}P_x$ ($0<x\leq1$).

The electronic device may be one of a flat panel display, a touch panel, a solar cell, an e-window, a heat mirror, and a transparent transistor.

DETAILED DESCRIPTION

Figure 1:
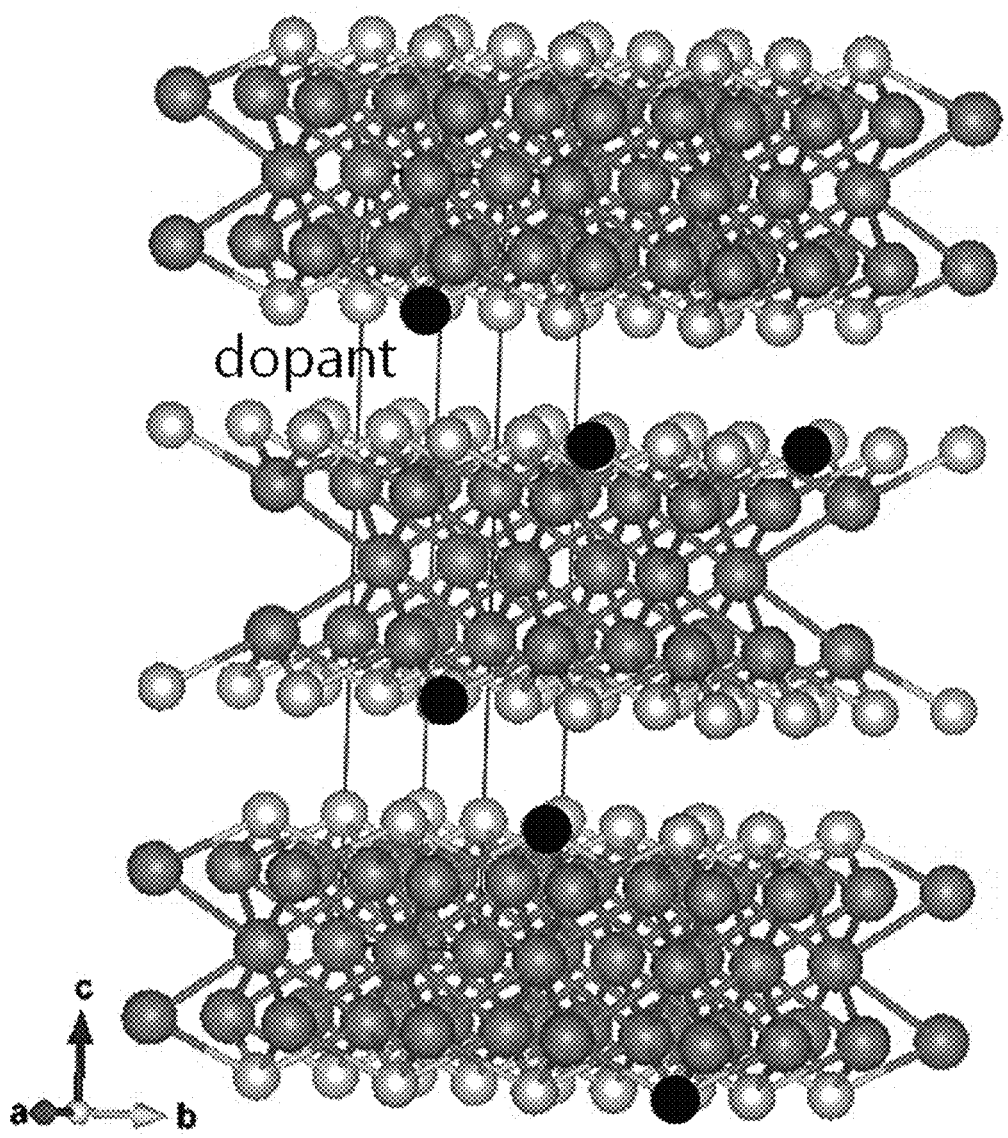
FIG. 1 is a schematic view showing the crystal structure of $Hf_3Te_{2-x}P_x$ according to example embodiments.

Advantages and characteristics of this disclosure, and a method for achieving the same, will become evident referring to the following example embodiments together with the drawings attached hereto. However, this disclosure may be embodied in many different forms and is not be construed as limited to the embodiments set forth herein; rather, these embodiments are provided so that this disclosure will satisfy applicable legal requirements. Therefore, in some embodiments, well-known process technologies are not explained in detail in order to avoid vague interpretation of the present inventive concepts.

If not defined otherwise, all terms (including technical and scientific terms) in the specification may be defined as commonly understood by one skilled in the art. The terms defined in a generally-used dictionary may not be interpreted ideally or exaggeratedly unless clearly defined.

It will be understood that when an element or layer is referred to as being "on," "connected to," "coupled to," or "covering" another element or layer, it may be directly on, connected to, coupled to, or covering the other element or layer, or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of the example embodiments. As used herein, the singular forms "a," "an," and "the" are intended to include the plural forms as well, unless the context clearly indicates otherwise.

In addition, unless explicitly described to the contrary, the word "comprise" or "include" and variations such as "comprises", "includes", "including" or "comprising" will be understood to imply the inclusion of stated elements but not the exclusion of any other elements.

In addition, the singular includes the plural unless mentioned otherwise.

In example embodiments, a hafnium telluride compound has a layered crystal structure and is represented by the following Chemical Formula 1.

$Hf_3Te_{2-x}A_x$  [Chemical Formula 1]

Herein, A is a Group V element, at least one selected from phosphorus (P), Arsenic (As), antimony (Sb), bismuth (Bi), sulfur (S) and selenium (Se), and $0 < x \leq 1$.

The hafnium telluride compound is a hafnium rich telluride compound. In example embodiments, the hafnium telluride compound may be $Hf_3Te_{2-x}P_x$ $(0 < x \leq 1)$.

The layered crystal structure of the hafnium telluride compound is shown in FIG. 1. Referring to FIG. 1, the hafnium telluride compound has a crystal structure including repeating unit structure layers. In each unit structure layer, the uppermost layer and the lowermost layer consists of a chalcogen element, Te, and a doped element, A. Hafnium metal elements exist between the uppermost layer and the lowermost layer. In the aforementioned structure, electrons of relatively high density (greater than or equal to about $10^{21}/cm^3$) are confined in a two-dimensional regular crystal structure, and thus relatively high electrical conductivity (greater than or equal to about 1000 S/cm) may be obtained. In addition, the hafnium telluride compound may be manufactured into a thin film by any known various deposition technologies as set forth below. In addition, as the hafnium telluride compound includes unit structure layers weakly linked to one another through a Van der Waals bond, the hafnium telluride compound may be exfoliated into a single atomic layer (e.g., a nanosheet) and thus applied to a transparent and electrically conductive film including this nanosheet.

When the material is used to form a transparent and electrically conductive film, the absorption coefficient (a) of the material plays an important role of determining transmittance of the manufactured film, and thus it is important whether optical properties, for example, an absorption coefficient, may be controlled by a material design. For example, graphite, a layered structure material having a relatively weak bond among layers, is exfoliated into a single atomic layer and manufactured into graphene. The graphene has improved conductivity characteristics, and thus has been expected to be advantageously used as a transparent conductive thin film. Furthermore, a conductive film using a layered compound may improve mechanical properties, for example, flexibility, and thus has been regarded to hold potential for a relatively highly flexible transparent conductive film material that may replace the indium tin oxide (ITO) of undesirable mechanical characteristics (e.g., flexibility). However, the graphene, a covalent bond based material, has a relatively high absorption coefficient and thus has relatively low transmittance. Accordingly, a transparent and electrically conductive film including the graphene may not include greater than or equal to about four sheets of single atomic layers, and its conductivity is not satisfactory.

On the other hand, although a transition metal dichalcogenide (TMD) (e.g., $MoS_2$, $WS_2$, and $WSe$), a type of a layered compound and an ionically bindable material, has an optical gap and may show somewhat improved transmittance, the conductivity is similar to that of a semiconductor, and thus may be used only as an auxiliary electrode (e.g., a hole injecting electrode) but cannot be employed as a main component for a transparent electrode.

As described above, since the indium tin oxide used as a conventional transparent electrode material has deteriorated conductivity during deposition at room temperature, there is an unstable supply of indium as a raw material. The indium tin oxide is hard to apply on a flexible substrate due to insufficient mechanical properties (e.g., flexibility), thereby research activities for developing an alternative material (e.g., a layered compound) have been vigorously made. However, the conventional layered compound has failed to have improved transmittance and relatively high conductivity.

By contrast, as the hafnium telluride compound represented by the above Chemical Formula 1 has a layered crystal structure in which unit structure layers are linked through a relatively weak bond (e.g., a Van der Waals bond), the hafnium telluride compound may be exfoliated into a single atomic layer. In addition, a bulk material of a hafnium telluride compound having a composition represented by the above Chemical Formula 1 may be used as a sintered body target in any physical/chemical vapor deposition process to manufacture a thin film.

In particular, the hafnium telluride compound may have the conductivity of a metallic material, because the compound includes two-dimensionally confined free electrons with a relatively high density. In addition, the hafnium telluride compound may exhibit a lower absorption coefficient when the compound is doped with a certain element of Group V, e.g., phosphorus (P).

Transmittance of the thin film may be defined by the following Equation 1.

$$T = C\exp(-at) \quad (T\text{:transmittance, } C\text{:constant, } a\text{:absorption coefficient, } t\text{:thickness of thin film}) \quad (1)$$

As shown from Equation 1, since the transmittance of the thin film has an exponential function relationship with an absorption coefficient (a), a relatively small change in the absorption coefficient may still have a greater effect on the transmittance.

Without being bound to a particular theory, the hafnium telluride layered compound according to example embodiments may have a relatively low absorption coefficient (i.e., largely improved transmittance) along with relatively high conductivity because of the following reason.

The hafnium telluride compound maintains the layered crystal structure of $Hf_3Te_2$ because an element A may play a role of a doping element and thus may be partially-substituted (e.g., doped) successfully with an anion moiety (i.e., a Te site). This fact may be confirmed by the results of an X-ray diffraction analysis result and the changes of a lattice constant depending on a composition.

In this structure, the element A may bring forth a result similar to hole doping and thus may decrease an absorption coefficient of a material while maintaining relatively high conductivity of the material.

The hafnium telluride compound may have a lattice constant (c) of greater than about 17.5 angstroms in a direction perpendicular to a unit structure layer. For example, the lattice constant (c) may be greater than or equal to about 17.6 angstroms, greater than or equal to about 17.7 angstroms, greater than or equal to about 17.8 angstroms, or greater than or equal to about 17.89 angstroms. The hafnium telluride compound may have specific resistance of less than or equal to about $1 \times 10^{-3}$ Ωcm at about 300 K. The absorption coefficient (a) of the hafnium telluride compound may have a ratio ($a/a_0$) of less than or equal to about 1, less than or equal to about 0.99, or less than or equal to about 0.98 relative to a $Hf_3Te_2$ absorption coefficient ($a_0$) for light ranging from about 1.8 to about 3.2 eV, about 2.7 to about 3.2 eV, or about 3.0 to about 3.2 eV.

The hafnium telluride compound may be prepared by obtaining a mixture of precursor powders having a desired composition ratio and heat-treating the same. In example embodiments, a hafnium compound (e.g., hafnium metal, hafnium oxide, hafnium nitride, and hafnium chloride), a tellurium compound (e.g., tellurium metal, tellurium oxide, tellurium nitride, and tellurium chloride), and an A element-containing compound (e.g., phosphorus (P), arsenic (As), antimony (Sb), bismuth (Bi), sulfur (S) and selenium (Se), and a compound thereof (e.g., an oxide, a nitride, or a chloride) are mixed at a stoichiometric amount ratio. As used herein, the stoichiometric amount ratio refers to a ratio among Hf:Te:A elements being about 3:2−x:x (provided that 0<x≤1) in the above Chemical Formula 1. The obtained mixture is pelletized. Optionally, a pellet thus prepared may be wrapped with a molybdenum foil. The pellet is put into a quartz glass tube, which is then sealed under a vacuum condition. The tube was put in a heating furnace and heat-treated for a predetermined time. For example, the tube is heated up to a uniformly increasing temperature of about 1000° C. over about 5 days and maintained at the temperature for about 2 days or longer, for example, 3 days or longer, about 4 days or longer, about 5 days or longer, e.g., for about 10 days. The obtained product may show a single phase of the hafnium telluride compound.

Example embodiments also provide a transparent and electrically conductive film including a hafnium telluride compound having a layered crystal structure and represented by the following Chemical Formula 1.

  [Chemical Formula 1]

Herein, A is at least one selected from phosphorus (P), Arsenic (As), antimony (Sb), bismuth (Bi), sulfur (S) and selenium (Se), and 0<x≤1.

The hafnium telluride compound represented by the above Chemical Formula 1 and a method of manufacturing the same are the same as described above.

The bulk material of the hafnium telluride obtained by the above method is used as a sintered body target in a conventional vapor deposition (e.g., a physical vapor deposition (PVD) method, for example, thermal evaporation or sputtering and/or a chemical vapor deposition (CVD) method, for example, MOCVD) and manufactured into a transparent conductive thin film having a desired thickness.

For example, the transparent conductive thin film may be prepared by conducting a sputtering process using the sintered body target including the hafnium telluride compound and sputtering gas including an inert gas. The sputtering may be performed in any known or commercially available apparatus and its conditions may be appropriately selected. In non-limiting examples, the sputtering may be carried out by using a (DC and/or RF) magnetron sputter including a DC power supply, an RF power supply, or a combination thereof. The inert gas may comprise argon (Ar), helium (He), neon (Ne), krypton (Kr), or a combination thereof, and for example, it may be the argon (Ar). If desired, the sputtering gas may further include oxygen or hydrogen.

The sputtering temperature may be in a range of about 10° C. to about 1000° C. without a particular limit. A distance between the target and the substrate has no particular limit, but may be in a range of greater than or equal to about 5 cm, for example, about 10 cm to about 30 cm. The sputtering may be performed for greater than or equal to about 5 minutes, but example embodiments are not limited thereto. The sputtering time may be adjusted to control thickness of a thin film. The degree of vacuum during the sputtering may be appropriately selected, for example, less than or equal to about 0.1 torr, less than or equal to about 0.01 torr, less than or equal to about $9\times10^{-3}$ torr, less than or equal to about $8\times10^{-3}$ torr, or less than or equal to about $7\times10^{-3}$ torr, but is not limited thereto.

The material and shape of the substrate has no particular limit, but may be appropriately selected. For example, the substrate may be formed of an inorganic oxide (e.g., glass), quartz, a resin (e.g., polystyrene, polycarbonate, polyolefin, polyethylene terephthalate, or polyimide), a semiconductor material (e.g., Si or Ga), a crystalline material (e.g., a monocrystal or polycrystal), but is not limited thereto. The substrate may have any shape. In another non-limiting example, the transparent conductive thin film may be manufactured from a sintered body through thermal evaporation. In the non-limiting example, the thermal evaporation may be performed under a vacuum atmosphere. The deposition temperature may be in a range of greater than or equal to about 400° C., for example, from about 500° C. to about 600° C., but is not limited thereto. Details of the substrate used during the thermal evaporation are the same as described above.

Alternatively, the bulk material of the hafnium telluride compound thus obtained may be subjected to exfoliation to prepare nanosheets thereof, which are then used to produce a transparent conductive thin film.

In other words, the transparent and electrically conductive film may be manufactured by obtaining a plurality of nanosheets through exfoliation of the bulk material of the hafnium telluride compound, and then connecting the plurality of nanosheets to contact with each other. In the layered crystalline structure, the unit structures for the above hafnium telluride compound are weakly bonded with each other, and thus the compound of the bulk state may be prepared as a nanosheet including one unit structure layer or at least two unit structure layers. The compound bulk material may be ultrasonificated in a solvent for exfoliation. Examples of the available solvent may include water, alcohol (e.g., isopropyl alcohol, ethanol, or methanol), N-methyl-2-pyrrolidone (NMP), hexane, benzene, toluene, chloroform, diethylether, dichloromethane (DCM), tetrahydrofuran (THF), ethyl acetate (EtOAc), acetone, dimethyl formamide (DMF), acetonitrile (MeCN), dimethyl sulfoxide (DMSO), ethylene carbonate, propylene carbonate, γ-butyrolactone, γ-valerolactone, and a combination thereof, but are not limited thereto. The solvent may further include an additive (e.g., a surfactant) in order to help the exfoliation and prevent agglomeration of the exfoliated nanosheets. The ultrasonication may be performed by using any known or commercially available ultrasonication device, and conditions for the ultrasonication are not particularly limited but are appropriately selected.

In order to promote the exfoliation, lithium atoms may be intercalated into the compound having an interlayered crystal structure. According to example embodiments, the hafnium telluride compound is impregnated in an alkylated lithium compound (e.g., butyl lithium) solution including an aliphatic hydrocarbon solvent (e.g., hexane), so that the lithium atoms may be intercalated inside the compound, and the obtained product is ultrasonicated to produce a plurality of nanosheets including the compound. For example, when the obtained product is put into water, the water and the intercalated lithium ions generate hydrogen between the layers of the crystal structure, which may promote separation between the layers. The manufactured nanosheets are separated by an appropriate method (e.g., centrifuging) and then washed.

The nanosheets thus obtained are brought into contact and connected with each other to produce a transparent and electrically conductive film. When the nanosheets are physically connected to form a thin film, the film thus prepared may show more enhanced transmittance. When the film is less than or equal to about 50 nm thick, it may have relatively high transmittance. The film using a nanosheet may be manufactured in any conventional method. For example, the formation of the film may be performed by dip coating, spray coating and/or printing after forming an ink or a paste.

According to example embodiments, the manufactured nanosheets are added to deionized water, and the resultant dispersion is again treated with ultrasonic waves. An organic solvent immiscible with water (e.g., an aromatic hydrocarbon, for example, xylene or toluene) is added to the ultrasonicated dispersion. When the mixture is shaken, a nanosheet thin film is formed on the interface between the water and the organic solvent. When a clean, wetted, and oxygen plasma-treated glass substrate is slightly dipped in the interface and taken out, the nanosheet thin film is spread out on the substrate at the interface. The thickness of the thin film may be adjusted by controlling a nanosheet concentration per area on the surface of the water/organic solvent and a speed/angle when the substrate is taken out.

The transparent and electrically conductive film shows relatively high conductivity, relatively high light transmittance, and improved flexibility, and thus may replace an electrode including a transparent conductive oxide, for example, ITO and ZnO, and a transparent film including an Ag nanowire.

Example embodiments provide an electronic device including the above transparent and electrically conductive film. The transparent and electrically conductive film is the same as described above. The electronic device may include, for example, a flat panel display (e.g., LCD, LED, and OLED), a touch screen panel, a solar cell, an e-window, a heat mirror, a transparent transistor, or a flexible display, but is not limited thereto.

Figure 11:
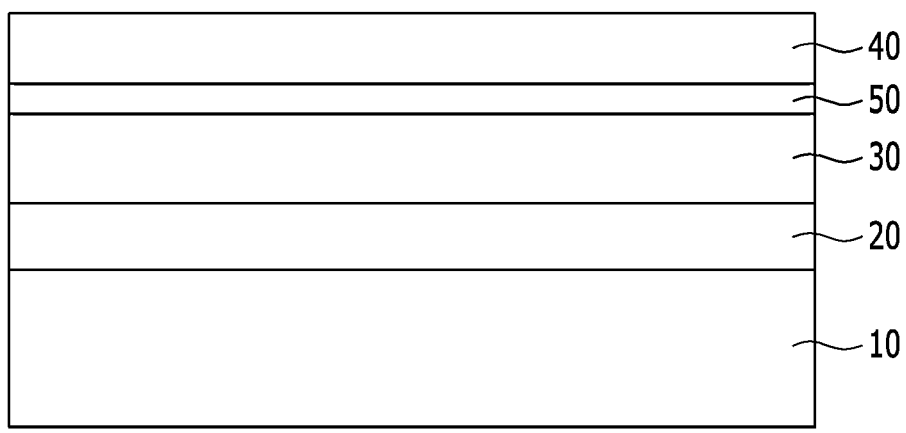
FIG. 11 is a cross-sectional view showing an electronic device (organic light emitting diode) including a transparent and electrically conductive film according to example embodiments.

FIG. 11 is a cross-sectional view of an organic light emitting diode device including a transparent conductor according to example embodiments. An organic light emitting diode device according to example embodiments includes a substrate 10, a lower electrode 20, an upper electrode 40 facing the lower electrode 20, and an emission layer 30 interposed between the lower electrode 20 and the upper electrode 40.

The substrate 10 may be made of an inorganic material (e.g., glass), or an organic material (e.g., polycarbonate, polymethylmethacrylate, polyethylene terephthalate, polyethylene naphthalate, polyamide, polyethersulfone, or a combination thereof, or a silicon wafer).

One of the lower electrode 20 and the upper electrode 40 is a cathode and the other is an anode. For example, the lower electrode 20 may be an anode and the upper electrode 40 may be a cathode.

At least one of the lower electrode 20 and the upper electrode 40 may be a transparent electrode. When the lower electrode 10 is a transparent electrode, the organic light emitting diode device may have a bottom emission structure in which light is emitted toward the substrate 10, while when the upper electrode 40 is a transparent electrode, the organic light emitting diode device may have a top emission structure in which light is emitted away from the substrate 10. In addition, when the lower electrode 20 and upper electrode 40 are both transparent electrodes, light may be emitted toward the substrate 10 and away from substrate 10.

The transparent electrode is made of the transparent and electrically conductive film including the above hafnium telluride compound. The transparent and electrically conductive film is the same as described above. A material for the transparent conductive film has characteristics of relatively high electron density and a small work function, and particularly, may be appropriately used in an environment requiring a small work function, for example, an OLED cathode. The material for a transparent conductive film as a single material may replace a conventional LiF/Al or MgAg alloy.

The emission layer 30 may be made of an organic material inherently emitting one among three primary colors, e.g., red, green and blue, or a mixture of an inorganic material with the organic material, for example, a polyfluorene derivative, a (poly)paraphenylene vinylene derivative, a polyphenylene derivative, a polyfluorene derivative, a polyvinylcarbazole, a polythiophene derivative, or a compound prepared by doping these polymer materials with a perylene-based pigment, a cumarine-based pigment, a rothermine-based pigment, rubrene, perylene, 9,10-diphenylanthracene, tetraphenylbutadiene, Nile red, coumarin and/or quinacridone. An organic light emitting device displays a desirable image by a spacious combination of primary colors emitted by an emission layer therein.

The emission layer 30 may emit white light by combining basic colors (e.g., three primary colors of red, green, and blue), and in this case, the color coordination may emit white light by combining the colors of adjacent pixels or by combining colors laminated in a perpendicular direction.

An auxiliary layer 50 may be positioned between the emission layer 30 and the upper electrode 40 to improve luminous efficiency of the emission layer 30. In the drawing, the auxiliary layer 50 is shown only between the emission layer 30 and the upper electrode 40, but is not limited thereto. The auxiliary layer 50 may be positioned between the emission layer 30 and the lower electrode 20, or between the emission layer 30 and the upper electrode 40 and between the emission layer 30 and the lower electrode 20.

The auxiliary layer 50 may include an electron transport layer (ETL) and a hole transport layer (HTL) for balancing between electrons and holes, an electron injection layer (EIL), and a hole injection layer (HIL) for reinforcing injection of electrons and holes. The auxiliary layer 50 may include one or more layers selected therefrom.

In addition, an example of applying the transparent and electrically conductive film to an organic light emitting diode device is illustrated, but the transparent and electrically conductive film may be used as an electrode for all electronic devices including a transparent electrode without a particular limit, for example, a pixel electrode and/or a common electrode for a liquid crystal display (LCD), an anode and/or a cathode for an organic light emitting diode device, a display electrode for a plasma display device, and a transparent electrode for a touch panel device.

Hereinafter, embodiments are illustrated in more detail with reference to examples. These examples, however, are not in any sense to be interpreted as limiting the scope of this disclosure.

EXAMPLE

Example 1

Figure 10:
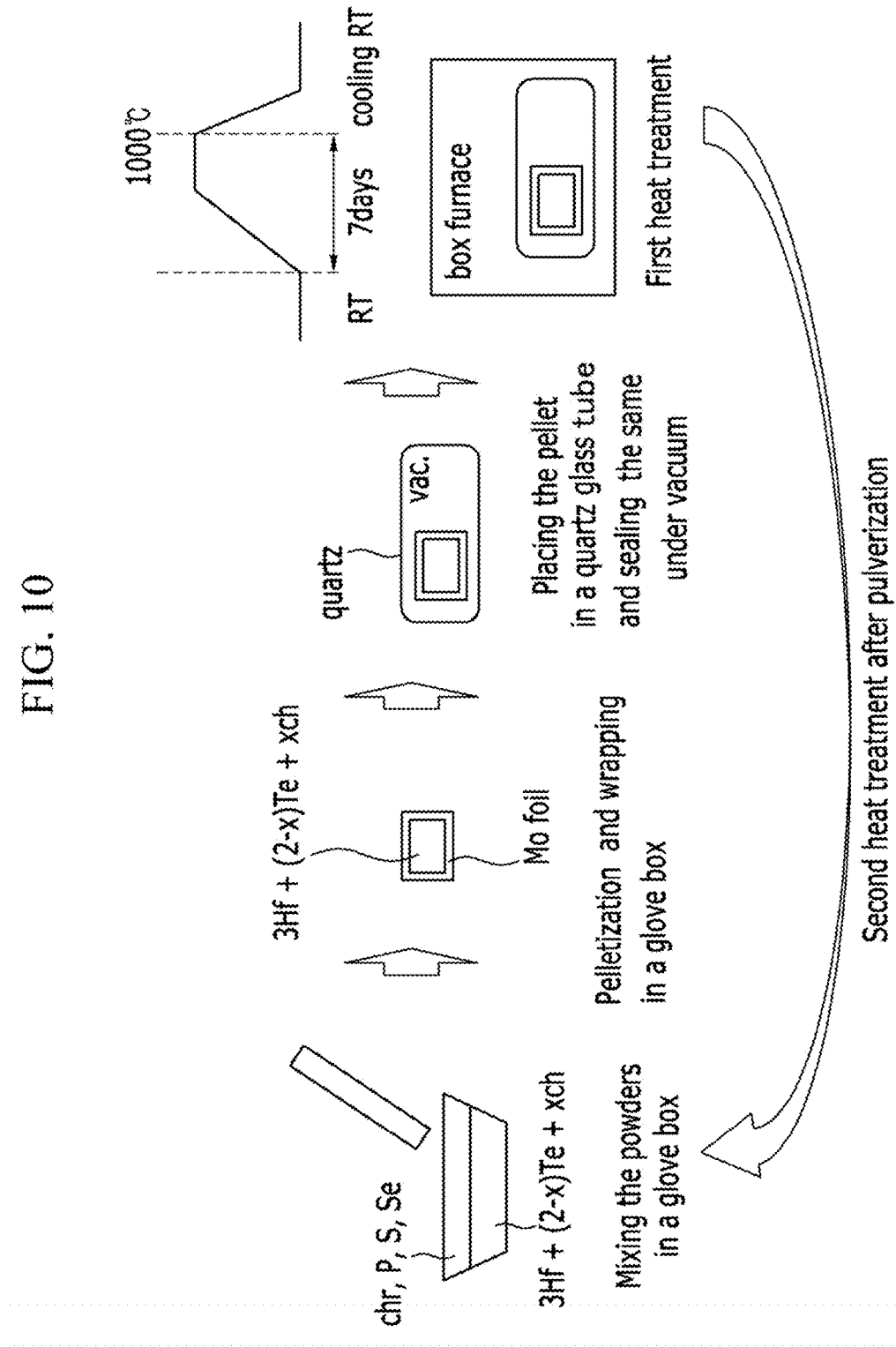
FIG. 10 schematically shows a process of manufacturing a hafnium-rich telluride compound according to example embodiments.

Preparation of $Hf_3Te_{2-x}P_x$ (Wherein, x is 0, 0.2, 0.4, 0.6, and 0.8) Compound $Hf_3Te_{2-x}P_x$ (wherein, x is 0, 0.2, 0.4, 0.6, and 0.8) compounds are manufactured according to a process as illustrated in FIG. 10. A Hf metal powder, a Te metal powder, and a phosphorus (P) powder are mixed to satisfy a composition of 3:2−x:x in a glove box. The mixture is pelletized in the glove box and wrapped with a Mo foil. A pellet thus obtained is put into a quartz glass tube and sealed under a vacuum condition. The quartz glass tube is placed in a furnace and heated up to 1000° C. by increasing its temperature over one day and maintained at the temperature for 5 days (a first heat treatment). In order to improve uniformity of the specimen, the primarily heat-treated powder is pulverized and subject to a second heat-treatment under the same conditions as set forth above.

Figure 2:
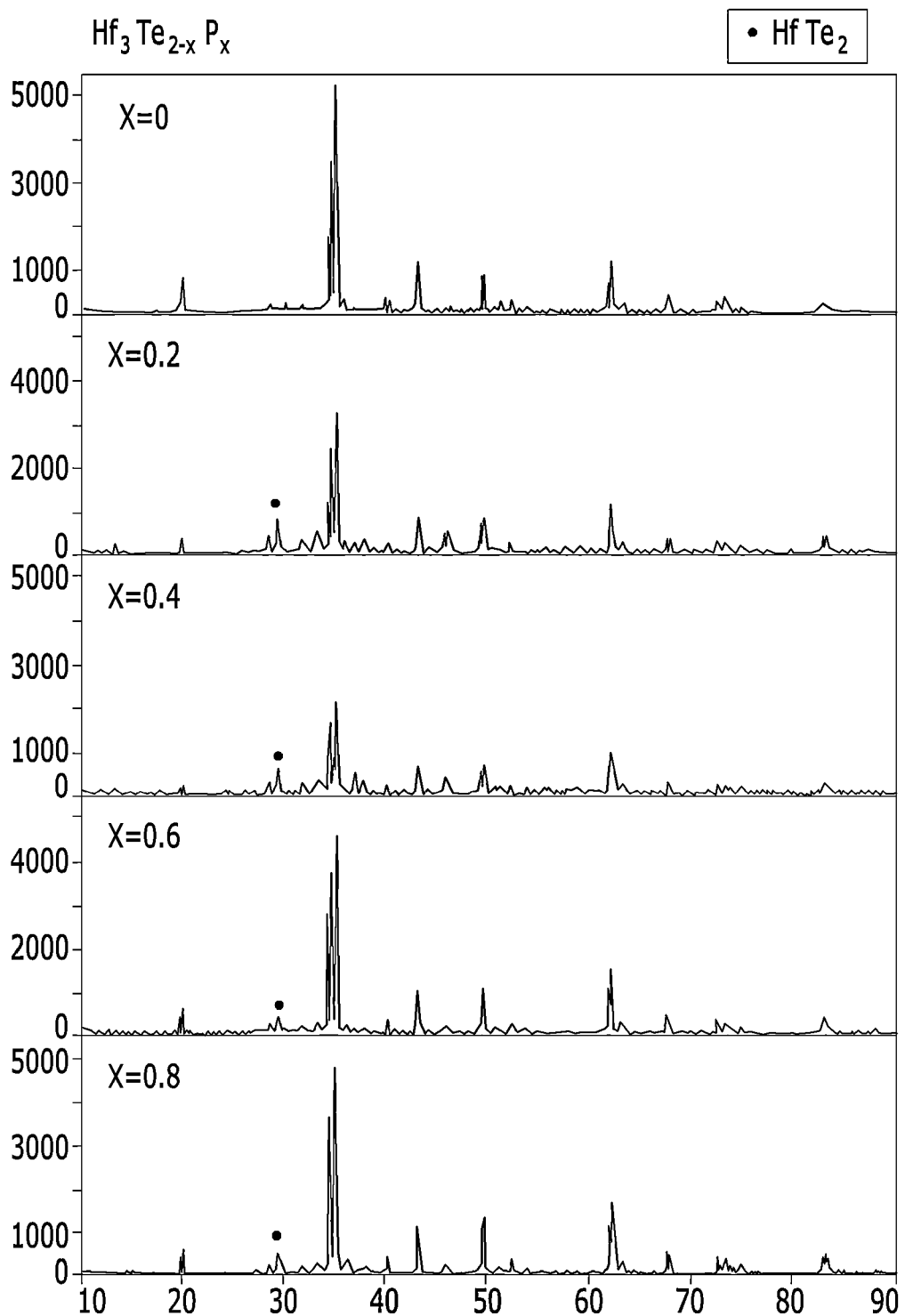
FIG. 2 shows an X-ray diffraction analysis result of the $Hf_3Te_{2-x}P_x$ according to Example 1.
Figure 3:
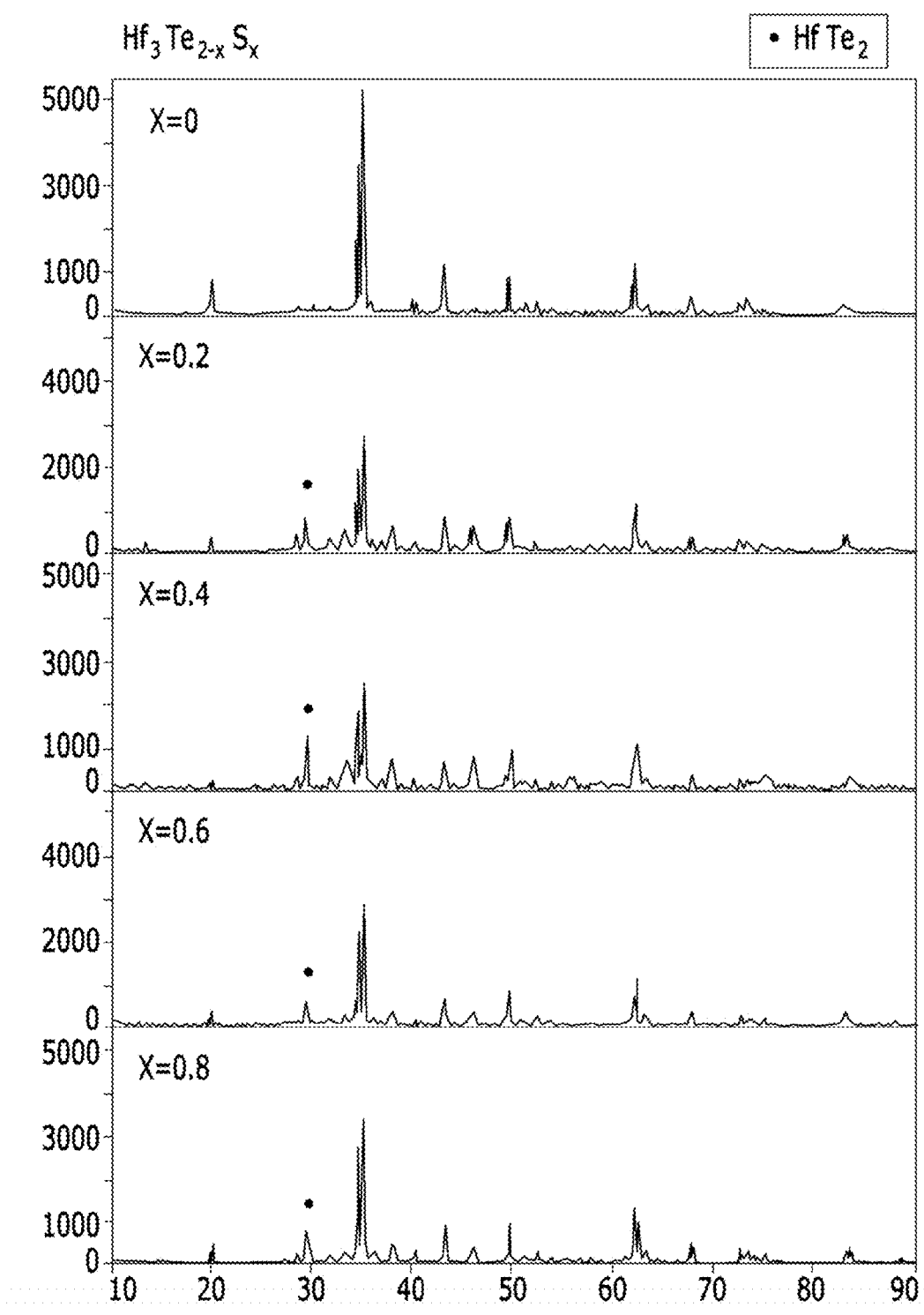
FIG. 3 shows an X-ray diffraction analysis result of $Hf_3Te_{2-x}S_x$ according to Example 2.
Figure 4:
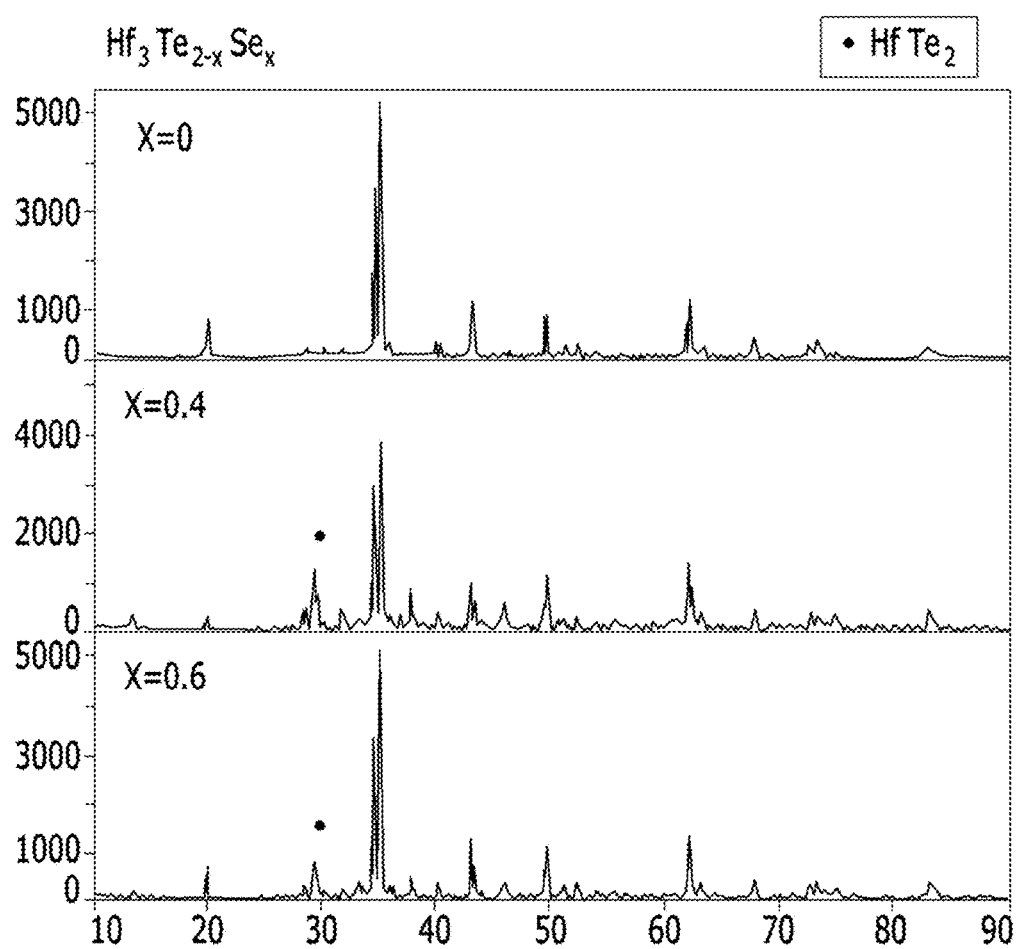
FIG. 4 shows an X-ray diffraction analysis result of $Hf_3Te_{2-x}Se_x$ according to Example 3.

X-ray diffraction analysis of the obtained specimen is performed by using D8 Advance (Bruker Corp.), and the results are shown in FIG. 2. Referring to FIG. 2, $Hf_3Te_2$ and substantially a diffraction peak of a pattern are observed other than a small amount of impurities (marked as a black dot). This result shows that the $Hf_3Te_2$ maintains a crystal structure, while phosphorous atoms are successfully introduced into the crystal structure.

Figure 5:
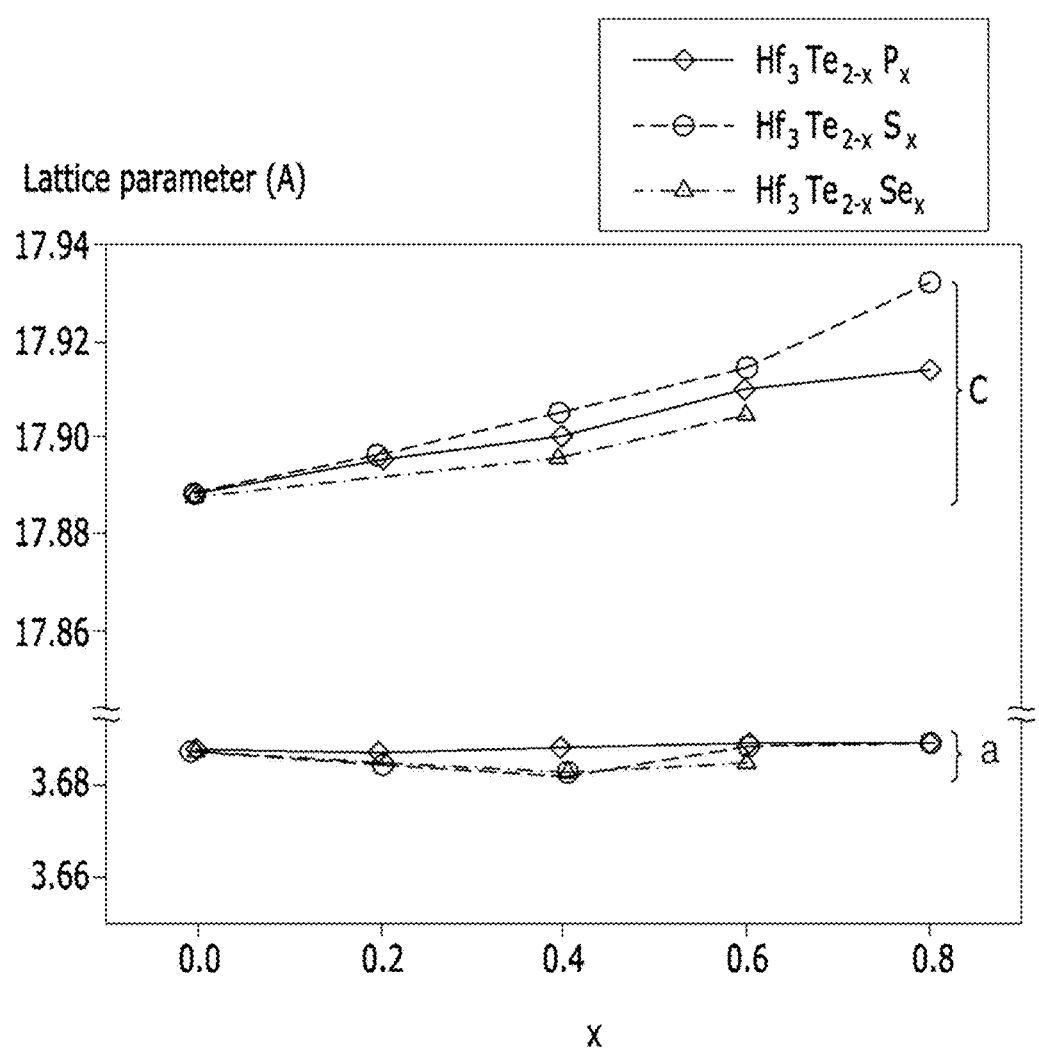
FIG. 5 is a graph showing changes of a lattice constant of the hafnium-rich telluride compounds of Examples 1, 2, and 3 in a c axis direction depending on the compositions.

Referring to the result of FIG. 2, a change in a lattice constant is calculated according to a plane index calculation method (2×plane indices×sin q=nl, q is the angle of a peak in an X-ray diffraction experiment, and l is the wavelength of the X-ray used for the diffraction experiment), and the results are shown in FIG. 5 and Table 1. Referring to the result of FIG. 5, as a doping concentration (x) increases, a lattice constant of the c axis linearly increases, and this result implies that a phosphorous element is partially substituted (doped) successfully in a Te anion site.

TABLE 1

| x of $Hf_3Te_{2-x}P_x$ | a | c |
| --- | --- | --- |
| 0 | 3.68719 | 17.88892 |
| 0.2 | 3.68666 | 17.89647 |
| 0.4 | 3.68700 | 17.90000 |
| 0.6 | 3.68874 | 17.91000 |
| 0.8 | 3.68874 | 17.91436 |

Example 2

Preparation of $Hf_3Te_{2-x}S_x$ (x is 0, 0.2, 0.4, 0.6, and 0.8) Compound

Compound represented by $Hf_3Te_{2-x}S_x$ (wherein, x is 0, 0.2, 0.4, 0.6, and 0.8) are prepared in the same manner as Example 1, except using S (sulfur) powder as a S source instead of the P source.

X-ray diffraction analysis of the specimen is performed by using D8 Advance (Bruker Corp.), and the result is shown in FIG. 2. Referring to FIG. 2, a diffraction peak pattern thus observed is substantially identical with $Hf_3Te_2$ except the presence of the peaks for a small amount of impurities (marked as a black dot). This result suggests that a sulfur element is successfully introduced into the crystal structure, while the $Hf_3Te_2$ crystal structure is maintained.

From the result of FIG. 2, a change of a lattice constant is checked according to a plane index calculation method, and the results are shown in FIG. 5 and Table 2. Referring to the result of FIG. 5, as a doping concentration (x) increases, a lattice constant of the c axis linearly increases, and this result suggests that a S element is partially substituted (doped) in a Te anion site.

TABLE 2

| x of $Hf_3Te_{2-x}S_x$ | a | c |
|---|---|---|
| 0 | 3.68719 | 17.88892 |
| 0.2 | 3.68458 | 17.89647 |
| 0.4 | 3.6825 | 17.90500 |
| 0.6 | 3.68874 | 17.91436 |
| 0.8 | 3.68874 | 17.9323 |

Example 3

Preparation of $Hf_3Te_{2-x}Se_x$ (Wherein, x is 0, 0.4, and 0.6) Compounds

Compounds represented by $Hf_3Te_{2-x}Se_x$ (wherein, x is 0, 0.4, and 0.6) are prepared according to the same method as Example 1, except for using Se (selenium) powder as a Se source instead of the P source.

X-ray diffraction analysis of the obtained specimen is performed by using D8 Advance (Bruker Corp.), and the results are shown in FIG. 2. Referring to FIG. 2, when x is 0.4 and 0.6, a diffraction peak pattern thus observed is substantially identical with $Hf_3Te_2$ except the presence of the peaks for a small amount of impurities (marked as black dot) may be observed, but when the x is 0.2 and 0.8, a different diffraction peak from the $Hf_3Te_2$ or no diffraction peak is found.

The result of FIG. 2 shows a change of a lattice constant according to a plane index calculation method, and the results are shown in FIG. 5 and Table 3. Referring to the result of FIG. 5, when a doping concentration (x) increases, a lattice constant in the c axis linearly increases.

TABLE 3

| x of $Hf_3Te_{2-x}Se_x$ | a | c |
|---|---|---|
| 0 | 3.68719 | 17.88892 |
| 0.4 | 3.68250 | 17.89647 |
| 0.6 | 3.68458 | 17.90500 |

Experimental Example 1

Specific Resistance

Figure 6:
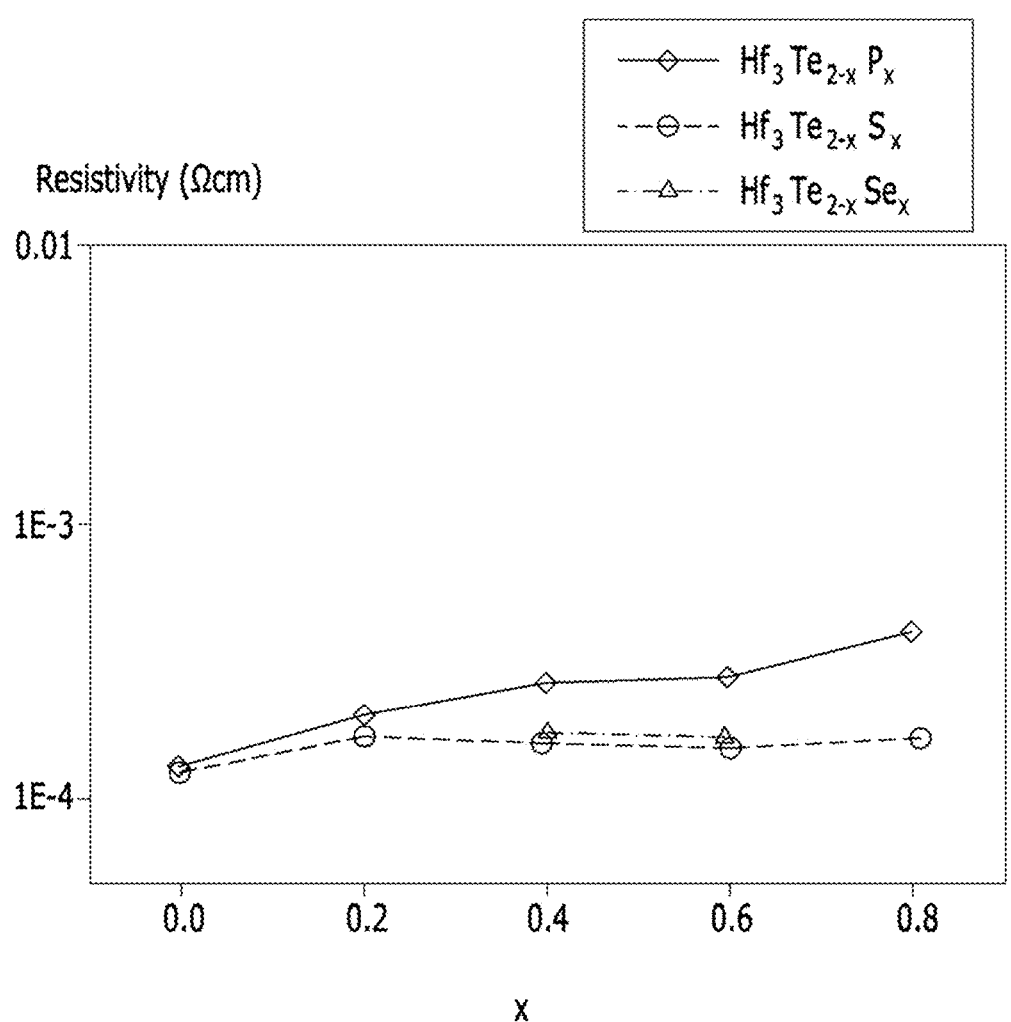
FIG. 6 is a graph showing changes of specific resistance of the hafnium-rich telluride compounds of Examples 1, 2, and 3 depending on the compositions.

Electrical conductivity is measured for the hafnium telluride compounds prepared in Examples 1, 2, and 3, and the results are shown in FIG. 6 and Table 4.

Electrical conductivity of the obtained sintered body is measured by using a multimeter (Keithley 2420 source meter) at room temperature in a 4-probe DC method. Specific resistance of a sample is obtained by measuring resistance from an IV graph after applying a current to the sample and measuring a voltage drop corresponding thereto and considering the size of the sample.

Referring to FIG. 6, the phosphorous-doped hafnium telluride of Example 1 has a somewhat increased specific resistance as x increases. This seems to be caused by a hole doping effect due to P substitution. The S or Se-doped hafnium telluride of Examples 2 and 3 (x=0.4, 0.6) shows substantially similar specific resistance to that of $Hf_3Te_2$.

TABLE 4

| Composition | Specific resistance (Ωcm) |
|---|---|
| $Hf_3Te_2$ | 1.291E-4 |
| $Hf_3Te_{2-x}P_x$ (x = 0.2) | 2.011E-4 |
| $Hf_3Te_{2-x}P_x$ (x = 0.4) | 2.576E-4 |
| $Hf_3Te_{2-x}P_x$ (x = 0.6) | 2.773E-4 |
| $Hf_3Te_{2-x}P_x$ (x = 0.8) | 3.963E-4 |
| $Hf_3Te_{2-x}S_x$ (x = 0.2) | 1.711E-4 |
| $Hf_3Te_{2-x}S_x$ (x = 0.4) | 1.611E-4 |
| $Hf_3Te_{2-x}S_x$ (x = 0.6) | 1.534E-4 |
| $Hf_3Te_{2-x}S_x$ (x = 0.8) | 1.659E-4 |
| $Hf_3Te_{2-x}Se_x$ (x = 0.4) | 1.753E-4 |
| $Hf_3Te_{2-x}Se_x$ (x = 0.6) | 1.666E-4 |

Experimental Example 2

Absorption Coefficient Ratio of $Hf_3Te_{2-x}P_x$, $Hf_3Te_{2-x}S_x$, and $Hf_3Te_{2-x}Se_x$ Compared with that of $Hf_3Te_2$ Depending on Doping Concentration (x)

Figure 7:
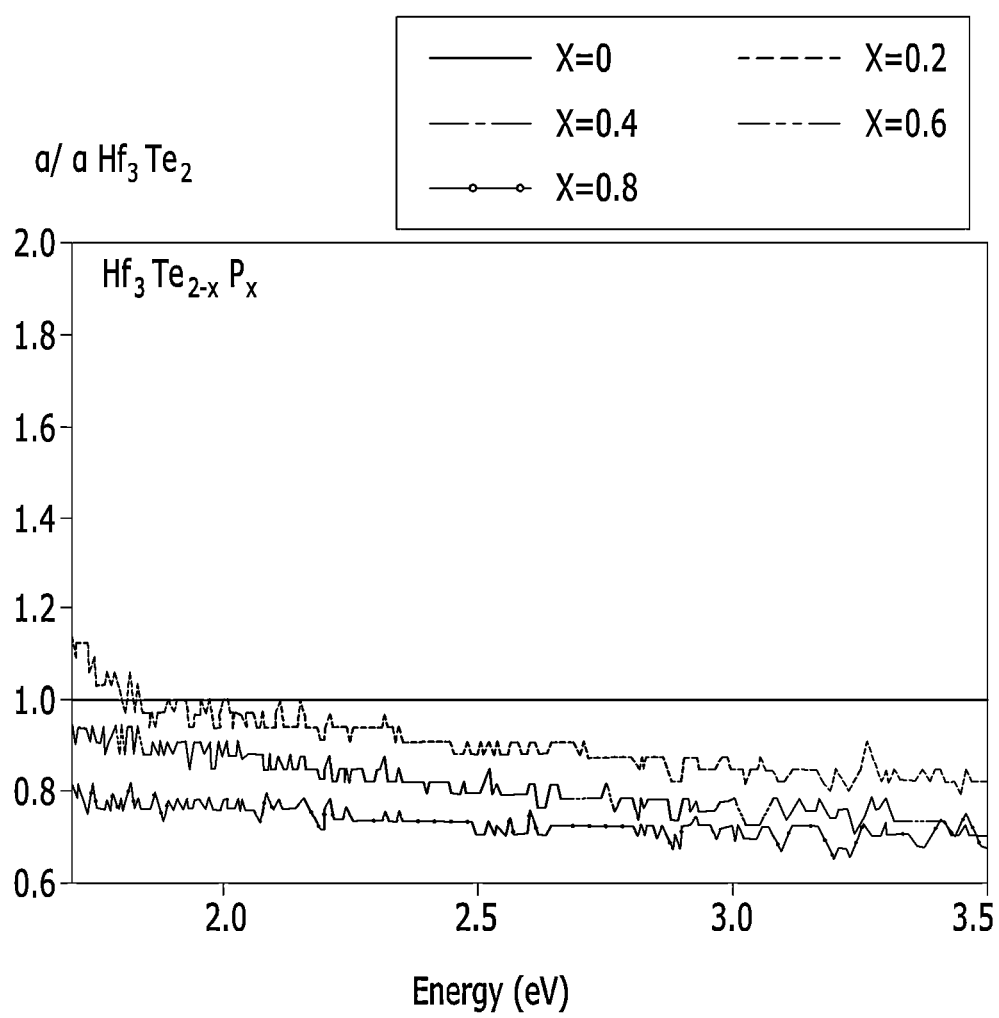
FIG. 7 is a graph showing a change of an absorption coefficient ratio of the hafnium-rich telluride compound of Example 1 depending on the composition.
Figure 8:
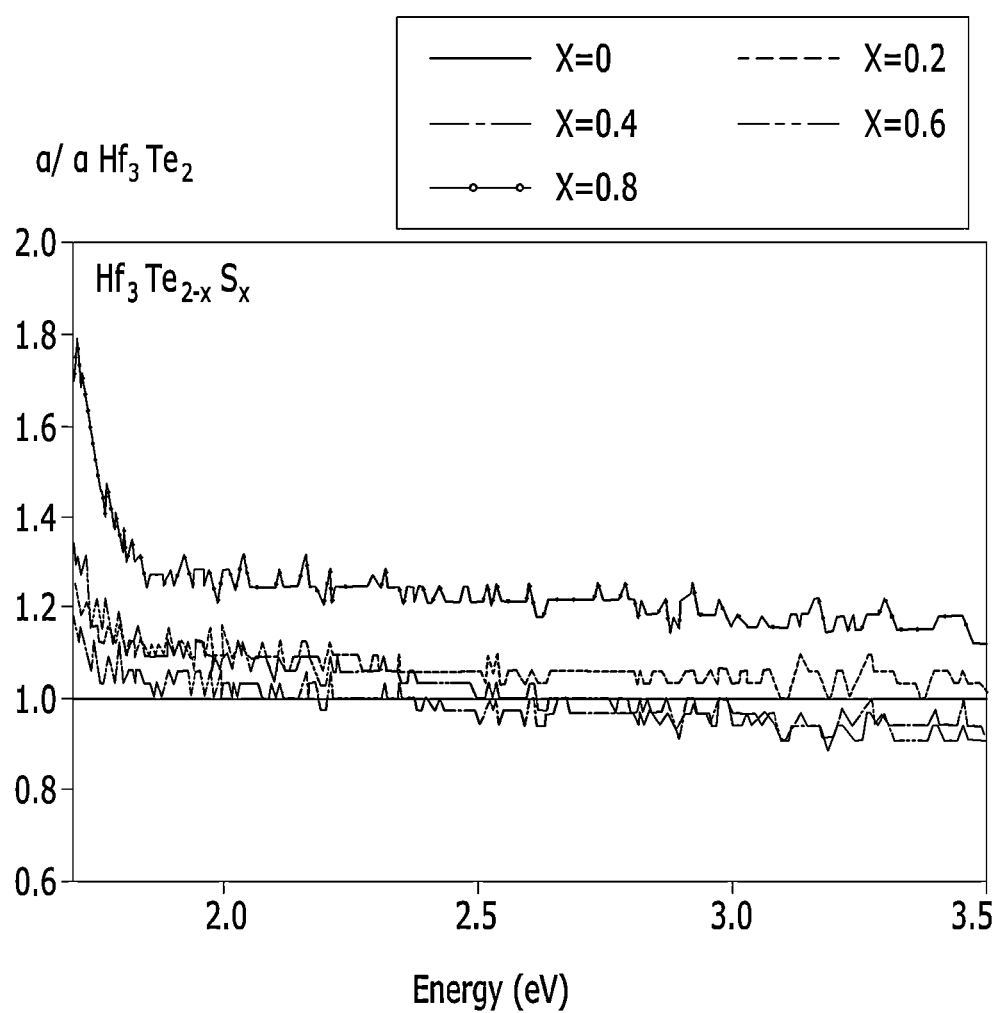
FIG. 8 is a graph showing a change of an absorption coefficient ratio of the hafnium-rich telluride compound of Example 2 depending on the composition.
Figure 9:
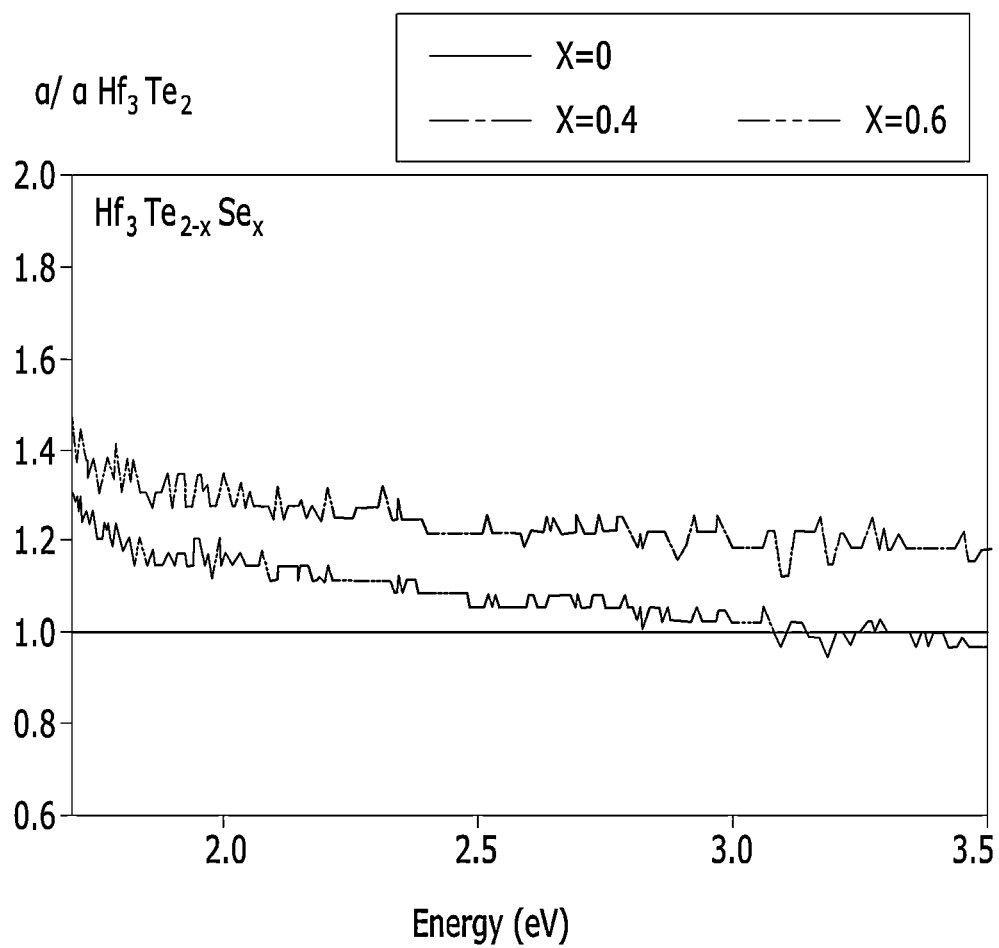
FIG. 9 is a graph showing a change of an absorption coefficient ratio of the hafnium-rich telluride compound of Example 3 depending on the composition.

Changes of relative absorption coefficients of $Hf_3Te_{2-x}P_x$, $Hf_3Te_{2-x}S_x$, and $Hf_3Te_{2-x}Se_x$ are measured by using a diffuse reflectance spectrum method, and the results are shown in FIGS. 7 to 9. The $Hf_3Te_{2-x}P_x$ has a ratio ($a/a_0$) of an absorption coefficient (a) relative to an absorption coefficient ($a_0$) of a non-doped hafnium telluride in a visible light wavelength range of less than 1, and the ratio ($a/a_0$) more sharply decreases when a doping concentration increases.

On the other hand, the $Hf_3Te_{2-x}S_x$ and the $Hf_3Te_{2-x}Se_x$ of Examples 2 and 3 show that their relative absorption coefficients do not decrease (or decreases very slightly) in the visible light wavelength range.

In order to find out the cause of the above results, a computer simulation analysis is made to predict changes in absorption coefficient of a hafnium telluride compound depending on hole doping and electron doping. As a result, an absorption coefficient decreases with an increase of a hole doping concentration. The results of the computer simulation analysis confirm that the decrease in the absorption coefficient for the compound of Example 1 is due to the phosphorous doping, which may result in a hole doping effect.

Example 4

$Hf_3Te_{2-x}P_x$ Thin Film

The sintered body obtained in Example 1 is used as a target and deposited on an $Al_2O_3$ substrate in pulsed laser deposition (PLD) by using a Nd/YAG laser under the following conditions.

PLD device: PLD 5000 Deposition Systems, PVD Products

Power: 60 mJ/cm$^2$

Time: 20 minutes

Substrate temperature: 600° C.

Vacuum degree: 2*10$^{-6}$

The $Hf_3Te_{2-x}P_x$ deposition film is about 20 nm thick and has relatively high conductivity and transparency.

Example 5

Thin Film Including $Hf_3Te_{2-x}P_x$ Nanosheet

The $Hf_3Te_{2-x}P_x$ sintered body according to Example 1 is dipped in a 1.6 M butyl lithium solution (in hexane) for 48 hours and taken out, and then rinsed with hexane several times and dried under an Ar atmosphere, obtaining lithium-intercalated $Hf_3Te_{2-x}P_x$. 15 to 20 g of the lithium-intercalated $Hf_3Te_{2-x}P_x$ is put in a vial in a glove box, and the vial is taken out of the glove box. Subsequently, 5-10 ml of water is added thereto, and the solution is ultrasonicated for 1 hour. Delamination as well as generation of hydrogen gas occurs, obtaining $Hf_3Te_{2-x}P_x$ monolayers (nanosheets).

The obtained nanosheets are centrifuged, the precipitate therein is rinsed with water until its pH becomes 7, and then the nanosheets are centrifuged again.

The nanosheet precipitate is put in a vial, 3 ml of deionized water is added thereto, and the mixture is ultrasonicated. 2 to 3 ml of toluene is added thereto, and a nanosheet thin film is formed at the interface of an aqueous layer and a toluene layer after the vial is shaken. Then, an oxygen plasma-treated glass substrate is slightly dipped in the interface. A $Hf_3Te_{2-x}P_x$ film at the interface is spread out on the glass substrate.

While this disclosure has been described in connection with what is presently considered to be practical exemplary embodiments, it is to be understood that the inventive concepts are not limited to the disclosed embodiments, but, on the contrary, is intended to cover various modifications and equivalent arrangements included within the spirit and scope of the appended claims.

What is claimed is:

1. A hafnium telluride compound comprising a layered crystal structure, the hafnium telluride compound represented by the following Chemical Formula 1:

$$Hf_3Te_{2-x}A_x \qquad \text{[Chemical Formula 1]}$$

wherein A is at least one selected from phosphorus (P), arsenic (As), antimony (Sb), bismuth (Bi), sulfur (S) and selenium (Se), and $0<x\leq 1$.

2. The hafnium telluride compound of claim 1, wherein the compound is represented by $Hf_3Te_{2-x}P_x$ ($0<x\leq 1$).

3. The hafnium telluride compound of claim 1, wherein the compound has a lattice constant (c) of greater than about 17.5 angstroms in a direction perpendicular to a unit structure layer.

4. The hafnium telluride compound of claim 1, wherein the compound has a ratio ($a/a_0$) of an absorption coefficient (a) relative to a $Hf_3Te_2$ absorption coefficient ($a_0$) for light ranging from about 1.8 to about 3.2 eV of less than or equal to about 1.

5. The hafnium telluride compound of claim 1, wherein the compound has a specific resistance of less than or equal to about $1\times 10^{-3}$ Ωcm at about 300 K.

6. A transparent and electrically conductive film, comprising:
a hafnium telluride compound having a layered crystal structure and represented by the following Chemical Formula 1:

$$Hf_3Te_{2-x}A_x \qquad \text{[Chemical Formula 1]}$$

wherein A is at least one selected from phosphorus (P), Arsenic (As), antimony (Sb), bismuth (Bi), sulfur (S) and selenium (Se), and $0<x\leq 1$.

7. The transparent and electrically conductive film of claim 6, wherein the compound is represented by $Hf_3Te_{2-x}P_x$ ($0<x\leq 1$).

8. The transparent and electrically conductive film of claim 6, wherein the compound has a lattice constant (c) of greater than about 17.5 angstroms in a direction perpendicular to a unit structure layer.

9. The transparent and electrically conductive film of claim 6, wherein the compound has a ratio ($a/a_0$) of an absorption coefficient (a) relative to a $Hf_3Te_2$ absorption coefficient ($a_0$) for light ranging from about 1.8 to about 3.2 eV of less than or equal to about 1.

10. The transparent and electrically conductive film of claim 6, wherein the compound has specific resistance of less than or equal to about $1\times 10^{-3}$ Ωcm at about 300 K.

11. An electronic device comprising the transparent and electrically conductive film of claim 6.

12. The electronic device of claim 11, wherein the compound is represented by $Hf_3Te_{2-x}P_x$ ($0<x\leq 1$).

13. The electronic device of claim 11, wherein the electronic device is one of a flat panel display, a touch panel, a solar cell, an e-window, a heat mirror, and a transparent transistor.

* * * * *